Sept. 29, 1959 C. J. KLEIN 2,906,928

ELECTRICAL NETWORK AUTOMATICALLY RESPONSIVE TO A RATE OF CHANGE OF A CONDITION AND A PREDETERMINED CHANGE OF THE CONDITION

Filed Sept. 26, 1955

INVENTOR

Clifford John Klein

BY

Ernest A. Jensen

ATTORNEY 2,906,928

ELECTRICAL NETWORK AUTOMATICALLY RESPONSIVE TO A RATE OF CHANGE OF A CONDITION AND A PREDETERMINED CHANGE OF THE CONDITION

Clifford John Klein, Riverdale, N.J., assignor to Specialties Development Corporation, Belleville, N.J., a corporation of New Jersey Application September 26, 1955, Serial No. 536,555

12 Claims. (Cl. 317—153)

The present invention relates to electrical networks which are automatically responsive to a change of a condition, and, more particularly, to such networks which are responsive to the rate of change of the condition and a predetermined change of the condition and are self-resetting.

The present invention, although useful for many other purposes as described hereinafter, is primarily concerned with improving heat and flame detecting systems of the type shown in United States Patent 2,850,684, September 2, 1958. In such systems, an element is utilized which comprises two conductors spaced apart by a material having an infinitely high resistance at a normal temperature to render it substantially non-conductive to electricity and having the characteristic of being rendered conductive at an abnormal temperature, and suitable means indicate or operate various devices when the abnormal temperature condition has been detected.

Accordingly, the primary object of the present invention is to provide an improved network of such type which is also capable of detecting the presence of an abnormal condition in response to a rate of change in condition.

Another object is to provide such a network wherein the rate-of-change of condition must persist for a predetermined duration before a response is effected.

Another object is to provide such a network which is constructed of a minimum number of relatively inexpensive, lightweight components adapted to be arranged in a compact manner.

Another object is to provide such a network which has a long useful life and requires a minimum of maintenance or repair.

Another object is to provide such a network which responds rapidly to a flaming fire and more slowly to a smoldering fire or overheat condition.

A further object is to provide such a network which has utility in a great many fields of application.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been found that the foregoing objects can be accomplished by providing a voltage dividing bridge type network which essentially comprises a source of unidirectional electrical current, first and second resistance elements connected in series across the source, third and fourth resistance elements connected in series across the source, the resistance elements having resistance values to provide a voltage dividing bridge normally unbalanced in one direction and one of the resistance elements being constructed and arranged so that the resistance thereof changes in response to a predetermined condition to another value whereby the bridge is unbalanced in the opposite direction, and a time constant network including an electromagnetically operable device, such as a polarity indicator or polarity sensing device, connected across the junction of the first and second resistance elements and the junction of the third and fourth resistance elements.

A preferred embodiment of the invention has been chosen for purposes of illustration and description, and is shown in the accompanying drawing, forming a part of the specification, wherein.

Figure 1:
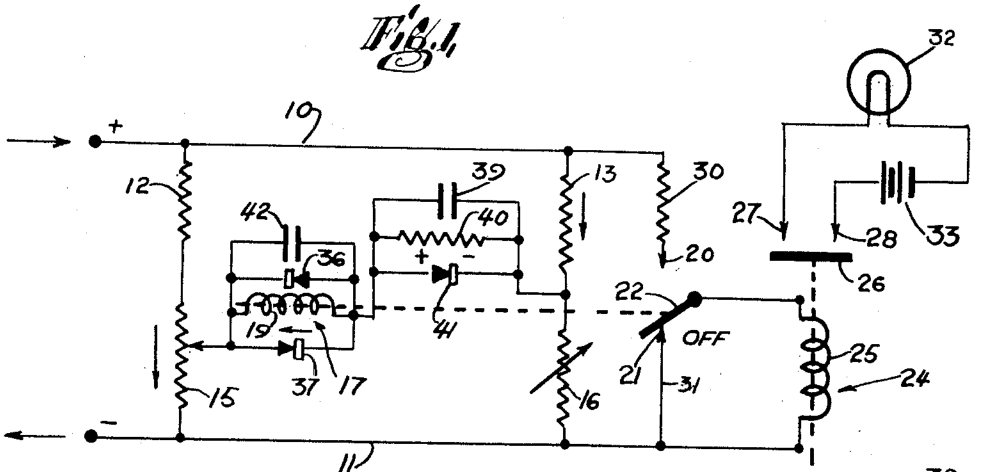
Figs. 1 and 2 are circuit diagrams illustrating the essential components arranged in a network in accordance with the invention, under normal and detecting conditions, respectively.

Referring to Fig. 1 of the drawing, a network is shown which essentially comprises a source of unidirectional electrical current represented by conductors 10 and 11, a pair of fixed resistors 12 and 13 (first and third resistors), a resistor 15 (second resistor), a condition sensing resistor 16 shown as a variable resistor (fourth resistor), a polarity indicator or polarity sensing device 17 having a winding 19, a pair of contacts 20 and 21 and a switch element 22 or their equivalents, and a relay 24 having a winding 25 and a switch element 26 for connecting contacts 27 and 28.

The source of current may be direct current from a battery or generator, or rectified alternating current. The conductor 10 is illustrated as being connected to the positive side of the source, and the conductor 11 is illustrated as being connected to the negative side of the source.

The resistors 12 and 13 act as balancing resistors and may have equal resistance values. These resistors are of the type which do not vary appreciably in resistance with ambient temperature changes and consequently remain in ratio when subjected to temperatures ranging from −65° F. to 160° F.

The resistor 15 is shown herein as a voltage divider and is adapted to provide a wide range in which the network may be accurately adjusted. This resistor also is practically immune to ambient temperature changes.

The condition sensing resistor 16 may be any element subject to changes in its resistance in response to the particular condition to be detected. For example, such an element may be sensitive to heat, light, humidity, or mechanical force. In the illustrative embodiment of the invention described herein, such an element is utilized to detect heat or flame on aircraft or other craft or vehicles, and comprises two conductors of electricity spaced apart by a thermistor-like material having an infinitely high resistance at a normal temperature to render it substantially non-conductive to electricity and having the characteristic of being rendered conductive at an abnormal temperature caused by the heat of flame or fire. Such elements are well known in the art as illustrated by U.S. Patent No. 2,586,252 and need not be described in detail herein.

The successful operation of such a network depends chiefly on the use of the ultra-sensitive polarity indicator 17 which is adapted to detect the change of polarity of the bridge error when the resistance of the sensing resistor 16 reaches a predetermined value. The switch element 22 of this indicator is pivotally mounted for free, torqueless movement thereof and has no appreciable mass. The switch element is under the control of the winding 19, as indicated by the broken line, whereby when current flows through the winding in one direction, the switch element engages the contact 20, and, when current flows through the winding in the opposite direction, the switch element engages the contact 21. The polarity indicator has no deflection gradient to speak of and thereby does not have any steady state intermediate position between the contacts 20 and 21.

The relay 24 may be of any common type wherein the switch element 26 is moved into engagement with the contacts 27 and 28 under the influence of the winding 25 to complete a circuit or is moved out of such engagement to break the circuit.

The foregoing components are arranged in the network in the manner about to be described. The resistors 12 and 15 (first and second resistors) are connected in series across the conductors 10 and 11 (source of current), and the resistors 13 and 16 (third and fourth resistors) are likewise connected in series across the conductors 10 and 11. One end or terminal of the winding 19 of the polarity indicator 17 is connected to the effective junction of the resistors 12 and 15, that is, in voltage dividing relation with respect to the resistors 12 and 15, and the other end or terminal of the winding 19 is connected to the junction of the resistors 13 and 16 through time constant components described hereinafter. The contact 20 of the indicator is connected to the conductor 10 (one side of source) through a limiting resistor 30, and the contact 21 is connected to the conductor 11 (other side of source) by a conductor 31. One end of the relay winding 25 is connected to the switch element 22, and the other end of this winding is connected to the conductor 11.

The relay switch element 26 and contacts 27 and 28 are adapted to control an alarm circuit including an indicator, such as a lamp 32, and a source of electrical current, such as a battery 33.

It will be understood that the relay 24 could operate a number of switch elements 26 adapted to close circuits for accomplishing other desired functions. Also, it will be apparent that such switch elements may be arranged to normally close or open a circuit or that certain switch elements may close a circuit while others may open a circuit. Furthermore, the relay switches could function as double-throw switches to close separate circuits in both positions of the relay.

The polarity indicator winding 19 is protected against high voltage surges by a pair of varistors 36 and 37 arranged in opposite directions and connected in parallel across the winding. These elements decrease in forward resistance with an increase in voltage, whereby high voltage current flows through these elements to short-circuit the winding 19 and eliminate the effect of such surges thereon.

It will also be understood that the sensing resistor 16 may have a positive coefficient of resistivity rather than a negative coefficient of resistivity, that is, the resistor becomes more conductive as the temperature decreases. With such an arrangement, the network serves to detect abnormally low temperatures and has utility as a control for turning on a heating system or shunting off a refrigerating system.

In the operation of the portion of the network just described, assuming that it is used as a heat or flame detector, the resistance of the resistor 15 is adjusted so that the network is in balance just before the resistor 16 is subjected to a fixed predetermined temperature condition it is designed to detect. The network then is out of balance at normal temperatures, and current tends to flow through the winding 19 and the other components as illustrated by the arrows in Fig. 1, whereby the switch element 22 is held against the contact 21.

Figure 2:
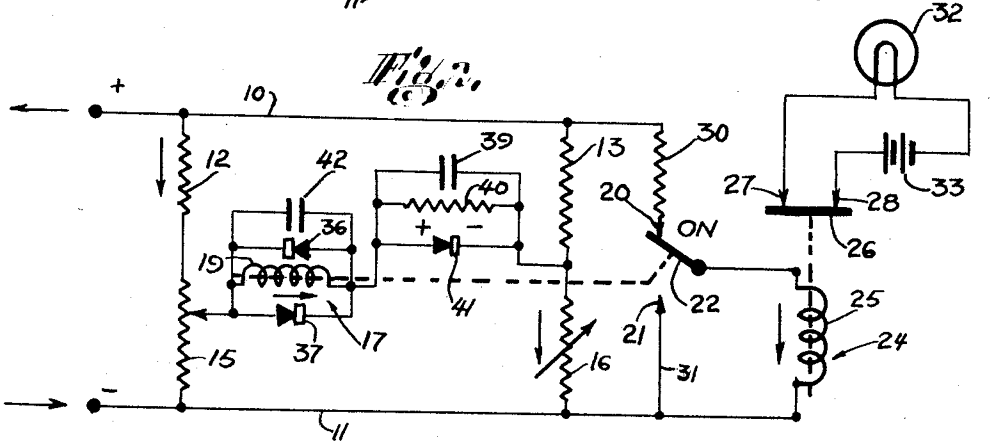

When the resistor 16 is subjected to heat or flame for a sufficient duration, its resistance is lowered whereupon it becomes sufficiently conductive to pass current so that the bridge becomes unbalanced in the opposite direction with current flowing through the winding and the other components as illustrated by the arrows in Fig. 2, whereby the switch element 22 is moved into and held in engagement with the contact 20. This causes the relay 24 to be energized and close the alarm circuit.

After the condition which heated the resistor 16 no longer exists and the resistor cools and increases in resistance, the network is again unbalanced into its original direction (Fig. 1) causing the relay 24 to drop out and reset the network.

The network described so far in detail is disclosed in the aforementioned patent. Now then, in accordance with the present invention this network further includes a time constant or rate of change of condition network which is connected in series with the polarity indicator winding 19 across the junction of resistors 12 and 15 and the junction of resistors 13 and 16.

This network comprises a condenser 39, a resistor 40 and a diode 41 connected in parallel.

When the circuit is in the condition shown in Fig. 1, the junction point of resistors 13 and 16 is more positive, with respect to the conductor 11, than is the effective junction point of the resistors 12 and 15, and therefore current flows from right to left (as viewed in the drawing) through the resistor 40 and the winding 19. If the value of resistor 16 is constant, the condenser 39 is charged to the voltage drop across resistor 40 which is equal to the potential at the junction of resistors 13 and 16 minus the potential at the effective junction of resistors 12 and 15 less the voltage drop across the winding 19.

The resistance of the coil 19 is low in comparison to the value of resistance 40, therefore, the condenser 39 is charged to slightly less than the difference in potential between the junction of resistors 13 and 16 and the effective junction of resistors 12 and 15.

As the resistance of resistor 16 decreases (for example, due to heat), the junction point of the resistors 13 and 16 becomes less positive with respect to the conductor 11, therefore, the difference in potential between this junction and the effective junction of resistors 12 and 15 decreases.

When the value of resistor 16 changes slowly, the condenser 39 discharges through the resistor 40 at a comparable rate, thus the charge on the condenser 39 remains substantially equal to the voltage drop across the resistor 40 and the potential at the right hand end of the coil 19 is equal to the potential at the junction of resistor 13 and 16 less the voltage drop across the resistor 40. The current flow through the winding 19 is then dependent only on the degree of bridge unbalance.

When, however, the value of the resistor 16 decreases rapidly, the potential at the junction of resistors 13 and 16 decreases more rapidly than the condenser 39 can discharge. The potential at the right hand end of coil 19 is then equal to the potential at the junction of resistors 13 and 16 less the charge on condenser 39.

If the value of resistor 16 changes at a rate sufficiently greater than the rate at which the charge on the condenser 39 can change, the potential at the right hand end of the coil 19 will be at a lower potential than the effective junction of resistors 12 and 15. Current will then flow from left to right through the winding 19 (as viewed in the drawing) until the rate of change of resistor 16 decreases and the condenser 39 discharges to the steady state voltage drop (that which would appear if the condenser was not present) across the resistor 40. To clearly illustrate the operation of the rate circuit mentioned it will be assumed that at a particular value of resistor 16 the potential at the junction of resistors 13 and 16 is 8.8 volts (with respect to conductor 11), the potential at the effective junction of resistors 12 and 15 is 3 volts, the voltage across the coil 19 is approximately 0.1 volt, and the voltage across resistor 40 is approximately 5.7 volts. These voltage values are those which would be present in a network connected to a 20 volt source of supply, comprising resistors having the values disclosed hereinafter and a coil 19 having a resistance of 1 kilo-ohm, and having its condition responsive resistor 16 exposed to 600° F. If the value of resistor 16 decreases at a rate such that the potential at the junction of resistors 13 and 16 drops to 8.5 volts in a period of time during which the condenser 39 can discharge only to 5.6 volts then the potential at the right hand end of the coil 19 is equal to 8.5 volts minus 5.6 volts or 2.9 volts. It may be seen therefore, that the potential at the left end of coil 19 (3 volts) is higher than the potential at the right end, and current will flow from left to right through the coil as long as the resistor 16 decreases in value at this rate.

Therefore, depending on the rapidity of the change of condition (rate of change), the condenser causes a transient voltage to be impressed across the winding 19 in the direction depending on the direction of the changing condition.

The diode 41 is for the purpose of providing a short circuit for the polarity of the voltage indicated across it, and therefore will not cause a fixed temperature response point to be effected by the resistor-capacitor arrangement in parallel therewith, such polarity occuring when the bridge is unbalanced to indicate heat or fire.

The resistor 40 is utilized to provide a path for steady state reset current through the winding 19 (Fig. 1) to drop out the relay 24 and to hold the switch element 22 against its contact 21.

The time constant network is arranged to sense rate of change on an order which would take place in the event the detecting resistor 16 is subjected to the heat of a flame, but not to sense more gradual ambient temperature changes which may occur under normal conditions of flight. To accomplish this, a condenser 39 having a capacitance of 60 mf. and a resistor 40 having a resistance of about 47 kilo-ohms are utilized.

In certain fields of application the resistor 40 or the diode 41 may be dispensed with.

The network is further arranged so that the time constant network cannot sense rate of change at temperatures below a predetermined level below the fixed temperature response level. For example, the bridge resistors have resistances whereby rate of change can be detected above 600° F. and a fixed temperature condition is detected at or above 700° F. This may be accomplished by utilizing resistors 12, 13, 15 and 16 having resistances of about 10, 8.2 and 10 kilo-ohms, and more than 200 megohms, respectively, at about 70° F., the resistors 12 and 15 being adjusted in voltage dividing relation to give them an effective resistance of 17 and 3 kilo-ohms, respectively.

The resistor 16 drops sharply in resistance above 500° F. and has a relatively low resistance value at the temperature the polarity indicator responds, which resistance is so related to the resistance of the resistor 15 to place the bridge in balance as the responsive temperature is approached. Thus, when the resistor 16 cools slightly it increases rapidly in resistance ratio-wise to rapidly unbalance the bridge to the off direction, whereby rapid resetting is effected. To accomplish this, the resistor 16 is constructed to have a resistance of about 37 kilo-ohms at 500° F., about 6.5 kilo-ohms at 600° F. and about 1150 ohms at 700° F.

In operation with the foregoing arrangement, high rate of change can be detected almost instantaneously above 600° F. to cause the polarity indicator to move the switch element 22 into engagement with the contact 20 to effect actuation of the alarm, and a heat condition, which is caused by a very slow increase in temperature, also can be detected almost instantly after the detecting resistor 16 has been heated to 700° F.

When a flame, detected by rate of temperature rise, has been extinguished, and the detecting resistor 16 is still at a temperature below 700° F. the bridge remains unbalanced in the condition indicated in Fig. 1. The alarm signal then disappears, indicating that the fire is out. Should the alarm signal continue, it is evident that a fixed temperature condition also exists.

Figure 3:
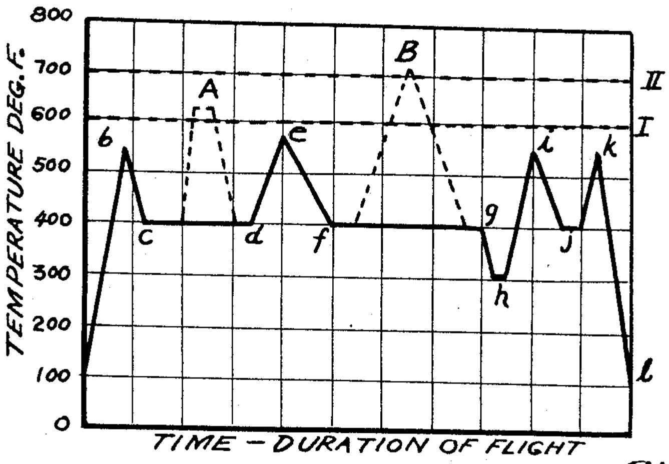
Fig. 3 is a graph illustrating the ambient temperature conditions which may occur during the various stages of an airplane while in flight and the temperatures resulting from abnormal conditions.

However, in certain fields of application, the detecting resistor may be subjected to a sudden flash of heat which endures for perhaps no longer than one second and in itself is not a dangerous condition to be detected. Thus, in order to prevent false alarms from being caused by such a condition, a filter condenser 42 is connected across the winding 19 of the polarity indicator 17 which functions to delay the operation of the indicator for about 2 or 3 seconds and thereby discriminate a fire from a heat flash. In Fig. 3, the ambient temperature conditions to which the detecting resistor is subjected during a typical flight of a jet plane on which the present system is installed are represented by the unbroken line, wherein various sections between points indicate the following particular stages of the flight:

*a—b* Warm-up and take-off.
*b—c* Cooling in level flight.
*c—d* Level flight.
*d—e* Combat maneuver.
*e—f* Return to level flight.
*f—g* Level flight.
*g—h* Descent for landing.
*h—i* Approach for landing.
*i—j* Taxiing.
*j—k* Run up to hangar.
*k—l* Cooling off.

The broken horizontal line I represents the minimum temperature level at which rate of temperature rise can indicate a fire, and the broken horizontal line II represents the minimum temperature level at which a fixed or enduring temperature condition can be detected.

The peak A represents a rate of temperature rise condition due to a fire which the resistor 16 senses. The peak B represents a rise in temperature at a slower rate than that which a flaming fire would produce. This condition, which may be due to overheat or a smoldering fire, is not detected until the resistor 16 senses it as a fixed temperature condition.

It will also be noted that the points *b*, *e*, *i* and *k* are below both lines I and II and therefore cannot produce a fixed temperature or rate of temperature rise condition, even if the rate of rise is high enough because the current flow across the bridge at such temperatures is not sensed by the time constant network.

From the foregoing description, it will be seen that the present invention provides a simple, practical, and reliable network which is responsive to a temperature rate of rise condition and a fixed temperature condition.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, and a time constant network including an electromagnetically operable device connected across the junction of said first and second elements and the junction of said third and fourth elements.

2. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, and an electromagnetically operable device and a condenser providing a network connected in series across the junction of said first and second elements and the junction of said third and fourth elements.

3. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, and an electromagnetically operable device and a network connected in series across the junction of said first and second elements and the junction of said third and fourth elements, said network comprising a condenser and a resistor connected in parallel.

4. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, and an electromagnetically operable device and a network connected in series across the junction of said first and second elements and the junction of said third and fourth elements, said network comprising a condenser and a diode connected in parallel.

5. In a heat responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof decreases in response to a rise in temperature whereby the bridge goes towards unbalance in the opposite direction, a time constant network including an electromagnetically operable device connected across the junction of said first and second elements and the junction of said third and fourth elements, whereby said device responds to a predetermined rate-of-rise in temperature as the bridge goes towards unbalance in the opposite direction.

6. A system according to claim 5, wherein said network includes a condenser and a diode so arranged whereby said device responds when the bridge is unbalanced in the opposite direction independently of rate-of-rise.

7. A system according to claim 5, wherein said network includes a condenser, a resistor and a diode so arranged whereby said device responds when the bridge is unbalanced in the opposite direction independently of rate-of-rise.

8. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, and an electromagnetically operable device and a network connected in series across the junction of said first and second elements and the junction of said third and fourth elements, said network comprising a condenser, a resistor and a diode connected in parallel.

9. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, a time constant network including an electromagnetically operable device connected across the junction of said first and second elements and the junction of said third and fourth elements, and a filter condenser connected across said device.

10. In a condition responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof changes in response to a predetermined condition to another value whereby the bridge goes towards unbalance in the opposite direction, an electromagnetically operable device and a network connected in series across the junction of said first and second elements and the junction of said third and fourth elements, said network comprising a condenser, a resistor and a diode connected in parallel, and a filter condenser connected across said device to momentarily delay the operation thereof.

11. In a heat responsive system, the combination of a source of unidirectional current, first and second resistance elements connected in series across said source, third and fourth resistance elements connected in series across said source, said elements having resistance values to provide a voltage dividing bridge normally unbalanced in one direction and one of said elements being constructed and arranged so that the resistance thereof decreases in response to a rise in temperature whereby the bridge goes towards unbalance in the opposite direction, a time constant network including an electromagnetically operable device connected across the junction of said first and second elements and the junction of said third and fourth elements, whereby said device responds to a predetermined rate-of-rise in temperature as the bridge goes towards unbalance in the opposite direction, said fourth element having a relatively low resistance value at the temperature said device responds and being so related to said third element to place the bridge in balance as such temperature is approached.

12. A system according to claim 11, wherein said network further includes a condenser, a resistor and a diode so arranged whereby said device responds when the bridge is unbalanced in the opposite direction independently of rate-of-rise.

References Cited in the file of this patent

UNITED STATES PATENTS

| | | |
|---|---|---|
| 2,279,849 | Warrington | Apr. 14, 1942 |
| 2,377,506 | McWhirter | June 5, 1945 |
| 2,467,856 | Rich | Apr. 19, 1949 |
| 2,483,408 | Garber | Oct. 4, 1949 |
| 2,577,137 | Low | Dec. 4, 1951 |